UNITED STATES PATENT OFFICE.

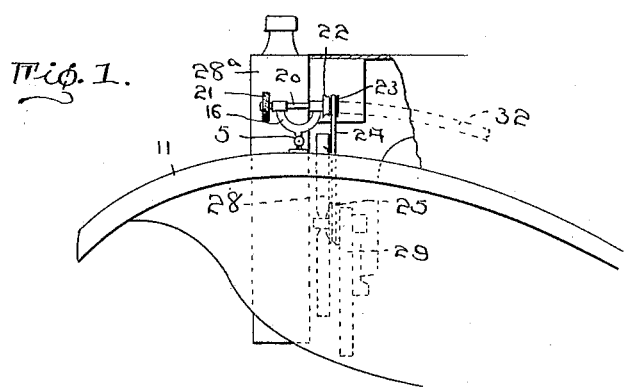

FRANK H. NYE, OF WARSAW, INDIANA.

MOTOR-VEHICLE ATTACHMENT.

1,400,971. Specification of Letters Patent. Patented Dec. 20, 1921.

Application filed November 18, 1919. Serial No. 338,957.

*To all whom it may concern:*

Be it known that I, FRANK H. NYE, a citizen of the United States, residing at Warsaw, in the county of Kosciusko and State of Indiana, have invented certain new and useful Improvements in a Motor-Vehicle Attachment, of which the following is a specification.

This invention has for its object to provide an attachment for motor vehicles whereby the power of the vehicle engine may be utilized in driving a rotary grinding element, horse clippers and similar light machinery by applying a power transmitting belt to the fan shaft of the engine.

Another object is the provision of a vehicle attachment of this type embodying a novel supporting bracket attachable to the mud guard or fender of the vehicle whereby the rotary grinding element is mounted in convenient position for operation and use.

Another object is the provision of a supporting bracket of this type which is afforded a comparatively wide range of adjustment for securing maximum efficiency thereof in use.

With these and other objects in view as will appear as the description proceeds, the invention comprises the novel features of construction, combination and arrangement of parts which will be more fully described in the following specification and then pointed out with particularity in the claims hereunto appended.

Figure 1 represents a fragmentary side elevation of a motor vehicle, the hood being partially broken away to illustrate the invention applied to use.

Fig. 2 represents an enlarged side elevation of the supporting bracket of the attachment illustrating a fragment of the fender to which it is attached, and Fig. 3 represents a diametrical sectional view through the pulley attachable to the shaft of the ventilating fan for the radiator whereby a power transmitting belt may be applied thereto.

Referring to the drawing in detail, wherein similar reference numerals designate corresponding parts throughout the several views, the numeral 5 designates generally the supporting bracket consisting of companion clamping members 6 and 7 carrying oppositely directed and alined base portions 8 and 9, the terminal of the member 9 being directed angularly to provide an anchoring hook 10 adapted to interlock with the flange bead 12 of the fender 11 whereby the supporting bracket, with the assistance of the several rivets or other fastening elements is rigidly maintained in position upon the fender. The terminals of the companion clamping members 6 and 7 opposite the base members 8 and 9 are formed with substantially semi-spherical socket parts 13 and the parallel portions of the companion members are apertured to accommodate bolts 14 coacting with wing nuts 15 whereby an adequate degree of pressure may be exerted in bringing the socket members 13 together.

A substantially U-shaped bearing member 16 is provided with a stem 17 depending from the web portion thereof and carrying a spherical enlargement 18 received in the opposed socket members 13 whereby the U-shaped bearing member is mounted for universal movement with relation to the supporting bracket and, by proper adjustment of the wing nuts 15 may be rigidly held in adjusted position.

The upper extremities of the bearing member 16 are provided with alined bearing sleeves 19 receiving a horizontally disposed shaft 20 provided at one terminal with a rotary abrading wheel 21 and at its opposite terminal with loose and rigid pulleys 22 and 23, respectively. The circumferential edges of the pulleys 22 and 23 are grooved to receive a power transmitting belt 24 and the inner walls of the pulley grooves are preferably of less height than the outer walls thereof in order to permit the belt to be conveniently shifted from the loose to the rigid pulley whereby the operation of the shaft 20 and grinding element 21 may be readily discontinued at the will of the operator.

A pulley 25 split diametrically is provided with abutting parallel flanges 26 receiving bolts 27 whereby the sections of the pulley are rigidly connected and clamped together about the shaft of the ventilating fan 28 for the vehicle radiator 28ª, as suggested in Fig. 1. The fan 28 is operated, as usual, by a belt 29 extending from the engine shaft to the fan shaft whereby rotary movement is transmitted to the latter during operation of the machine and when the pulley 25 is properly applied to the fan shaft and is connected by the belt 24 with either of the pulleys 22 and 23 rotary movement is imparted thereto.

In operating the grinding element 21, the belt is adjusted to run on the rigid pulley 23 and the rotary movement of the latter is transmitted to the shaft 20. However, when it is desired to discontinue the operation of the grinding element the belt is shifted to the loose pulley 22 which latter, as will be understood, is freely rotatable with relation to the shaft 20. However, when it is desired to utilize the attachment for operating a horse clipper, the rigid pulley 23 which is secured in position in the usual manner to the shaft 20 is removed and the flexible drive shaft of the horse clipper is connected with the shaft 20 and is operated by a pulley ordinarily provided upon the clipping machine. In a like manner, various other types of light machines may be operated by the attachment.

What I claim is:

1. In combination, a motor radiator ventilating fan, a vehicle mud guard, a shaft rotatably mounted upon the mud guard, and a driving connection between the shaft and the fan.

2. In combination, a motor driven ventilating fan, a detachable two part pulley removably applied thereto, a vehicle mud guard, a shaft rotatably supported upon the mud guard, loose and rigid pulleys mounted upon the shaft, and a belt extending over the two-part pulley and alternately engageable with the rigid and loose pulleys.

3. In combination, a motor driven radiator ventilating fan, a vehicle mud guard, a bracket pivotally secured to the mud guard, a shaft journaled in said bracket, and driving connections between the shaft and fan.

4. In combination, an engine radiator ventilating fan, a vehicle mud guard, a bracket, means movably connecting the bracket with the mud guard for universal movement with relation thereto, means for rigidly securing the bracket in adjusted position, a shaft journaled in said bracket and means connecting the shaft with the fan.

5. In a motor vehicle attachment, companion bracket members, socket sections carried by the members, a substantially U-shaped bearing member, a shaft journaled in said bearing member, a spherical enlargement carried by the bearing member received and movable in the socket members, means for rigidly clamping the spherical enlargement in the socket members, a split pulley for application to the fan shaft of an engine, and a driving connection between the two-part pulley and shaft.

6. In a motor vehicle attachment, a pair of companion vehicle fender engaging bracket members, a fender engaging hook carried by the terminal of one of the members, socket members carried by the bracket members, a spherical member adjustably mounted in the socket, means for securing the spherical member in adjusted position in the socket, a bearing member carried by the spherical member, a shaft journaled in the bearing member, a split pulley for application to a motor vehicle fan shaft, and a driving connection between the two-part pulley and shaft.

In testimony whereof, I affix my signature hereto.

FRANK H. NYE.